(12) United States Patent
Shivanath et al.

(10) Patent No.: US 9,993,874 B2
(45) Date of Patent: Jun. 12, 2018

(54) COMPOSITION AND PROCESSING OF METALLIC INTERCONNECTS FOR SOFC STACKS

(71) Applicants: STACKPOLE INTERNATIONAL, Ancaster (CA); BLOOM ENERGY CORPORATION, Sunnyvale, CA (US)

(72) Inventors: Rohith Shivanath, Toronto (CA); Brendan Ayre, Waterdown (CA); Tad Armstrong, Burlingame, CA (US); Michael Gasda, Mountain View, CA (US); Daniel Darga, Pleasanton, CA (US); Harald Herchen, Los Altos, CA (US); Chockkalingam Karuppaiah, Cupertino, CA (US); Brandon Dawson, Sunnyvale, CA (US); Ravi Oswal, Fremont, CA (US)

(73) Assignees: BLOOM ENERGY CORPORATION, Sunnyvale, CA (US); STACKPOLE INTERNATIONAL POWDER METAL, ULC, Ancaster (CA)

( * ) Notice: Subject to any disclaimer, the term of this patent is extended or adjusted under 35 U.S.C. 154(b) by 420 days.

(21) Appl. No.: 14/629,807

(22) Filed: Feb. 24, 2015

(65) Prior Publication Data

US 2015/0244004 A1    Aug. 27, 2015

Related U.S. Application Data

(60) Provisional application No. 61/944,381, filed on Feb. 25, 2014.

(51) Int. Cl.
*B22F 5/00* (2006.01)
*C22C 27/06* (2006.01)
(Continued)

(52) U.S. Cl.
CPC .............. *B22F 5/00* (2013.01); *B22F 1/0014* (2013.01); *C22C 1/045* (2013.01); *C22C 27/06* (2013.01);
(Continued)

(58) Field of Classification Search
CPC ...... B22F 2998/10; B22F 1/0003; B22F 3/02; B22F 1/0014; B22F 2998/00;
(Continued)

(56) References Cited

U.S. PATENT DOCUMENTS 4,135,041 A   1/1979  Jung et al.
4,292,379 A   9/1981  Kothmann
(Continued)

FOREIGN PATENT DOCUMENTS

EP   0615299 A1   9/1994
EP   1098380 A1   9/2001
(Continued)

OTHER PUBLICATIONS

International Preliminary Report on Patentability and Written Opinion of the International Searching Authority for PCT/US2015/017226, dated Sep. 14, 2016, 10 pages.
(Continued)

*Primary Examiner* — Colleen P Dunn
*Assistant Examiner* — Nicholas A Wang
(74) *Attorney, Agent, or Firm* — The Marbury Law Group PLLC

(57) ABSTRACT

A chromium-iron interconnect includes at least one of Fe rich regions in the interconnect and carbon in the interconnect.

17 Claims, 3 Drawing Sheets

(51) Int. Cl.
    *B22F 1/00*         (2006.01)
    *H01M 8/0217*     (2016.01)
    *H01M 8/0226*     (2016.01)
    *C22C 1/04*       (2006.01)
    *H01M 8/124*      (2016.01)
    *B22F 3/02*       (2006.01)

(52) U.S. Cl.
    CPC ....... H01M 8/0219 (2013.01); H01M 8/0226 (2013.01); *B22F 2003/023* (2013.01); *B22F 2207/01* (2013.01); *B22F 2998/10* (2013.01); *H01M 2008/1293* (2013.01)

(58) Field of Classification Search
    CPC ........ B22F 1/0085; B22F 3/10; B22F 3/1017; B22F 3/1021; B22F 2003/023; B22F 2207/01; B22F 5/00; C22C 1/045; C22C 27/06; H01M 2008/1293; H01M 8/0219; H01M 8/0226
    USPC ......................................................... 419/535
    See application file for complete search history.

(56) References Cited

U.S. PATENT DOCUMENTS

| | | | |
|---|---|---|---|
| 4,755,429 A | 7/1988 | Nickols et al. | |
| 4,913,982 A | 4/1990 | Kotchick et al. | |
| 5,162,167 A | 11/1992 | Minh et al. | |
| 5,213,910 A | 5/1993 | Yamada | |
| 5,215,946 A | 6/1993 | Minh | |
| 5,248,712 A | 9/1993 | Takeuchi et al. | |
| 5,256,499 A | 10/1993 | Minh et al. | |
| 5,273,837 A | 12/1993 | Aiken et al. | |
| 5,290,642 A | 3/1994 | Minh et al. | |
| 5,342,705 A | 8/1994 | Minh et al. | |
| 5,368,667 A | 11/1994 | Minh et al. | |
| 5,382,315 A | 1/1995 | Kumar | |
| 5,385,792 A | 1/1995 | Shiratori et al. | |
| 5,453,331 A | 9/1995 | Bloom et al. | |
| 5,460,897 A | 10/1995 | Gibson et al. | |
| 5,476,248 A | 12/1995 | Kobayashi et al. | |
| 5,494,700 A | 2/1996 | Anderson et al. | |
| 5,501,914 A | 3/1996 | Satake et al. | |
| 5,518,829 A | 5/1996 | Satake et al. | |
| 5,554,454 A | 9/1996 | Gardner et al. | |
| 5,589,017 A | 12/1996 | Minh | |
| 5,641,585 A | 6/1997 | Lessing et al. | |
| 5,733,499 A | 3/1998 | Takeuchi et al. | |
| 5,942,349 A | 8/1999 | Badwal et al. | |
| 5,955,392 A | 9/1999 | Takeuchi et al. | |
| 5,964,991 A | 10/1999 | Kawasaki et al. | |
| 5,981,098 A | 11/1999 | Vitale | |
| 6,001,761 A | 12/1999 | Hata et al. | |
| 6,183,897 B1 | 2/2001 | Hartvigsen et al. | |
| 6,280,868 B1 | 8/2001 | Badwal et al. | |
| 6,361,892 B1 | 3/2002 | Ruhl et al. | |
| 6,406,809 B1 | 6/2002 | Fujii et al. | |
| 6,444,340 B1 | 9/2002 | Jaffrey | |
| 6,492,053 B1 | 12/2002 | Donelson et al. | |
| 6,492,055 B1 | 12/2002 | Shimotori et al. | |
| 6,503,653 B2 | 1/2003 | Rock | |
| 6,582,845 B2 | 6/2003 | Helfinstine et al. | |
| 6,589,681 B1 | 7/2003 | Yamanis | |
| 6,635,378 B1 | 10/2003 | Yang et al. | |
| 6,638,575 B1 | 10/2003 | Chen et al. | |
| 6,777,126 B1 | 8/2004 | Allen | |
| 6,835,488 B2 | 12/2004 | Sasahara et al. | |
| 6,890,677 B2 | 5/2005 | Klitsner et al. | |
| 7,045,237 B2 | 5/2006 | Sridhar et al. | |
| 7,150,934 B2 | 12/2006 | Yoshida et al. | |
| 7,190,568 B2 | 3/2007 | Wood et al. | |
| 7,390,456 B2 | 6/2008 | Glatz et al. | |
| 8,110,319 B2 | 2/2012 | Nguyen et al. | |
| 8,173,063 B2 | 5/2012 | Sridhar et al. | |
| 8,241,817 B2 | 8/2012 | Yang et al. | |
| 8,574,780 B2 | 11/2013 | Terada et al. | |
| 8,840,833 B1 | 9/2014 | Janousek et al. | |
| 8,852,825 B2 | 10/2014 | Batawi et al. | |
| 8,962,219 B2 | 2/2015 | Couse et al. | |
| 2002/0012825 A1 | 1/2002 | Sasahara et al. | |
| 2002/0081478 A1 | 6/2002 | Busenbender | |
| 2002/0132156 A1 | 9/2002 | Ruhl et al. | |
| 2003/0022053 A1 | 1/2003 | Anderson et al. | |
| 2003/0082434 A1 | 5/2003 | Wang et al. | |
| 2003/0157387 A1 | 8/2003 | Hase et al. | |
| 2003/0170527 A1 | 9/2003 | Finn et al. | |
| 2003/0180602 A1 | 9/2003 | Finn | |
| 2004/0101742 A1 | 5/2004 | Simpkins et al. | |
| 2004/0200187 A1 | 10/2004 | Warrier et al. | |
| 2005/0017055 A1 | 1/2005 | Kurz et al. | |
| 2005/0019646 A1 | 1/2005 | Joos | |
| 2005/0076976 A1 | 4/2005 | Ide et al. | |
| 2005/0084725 A1 | 4/2005 | Arthur et al. | |
| 2005/0136312 A1 | 6/2005 | Bourgeois et al. | |
| 2005/0227134 A1 | 10/2005 | Nguyen | |
| 2005/0255355 A1 | 11/2005 | Ukai et al. | |
| 2005/0255364 A1 | 11/2005 | Cho et al. | |
| 2006/0192323 A1 | 8/2006 | Zobl et al. | |
| 2006/0193971 A1 | 8/2006 | Tietz et al. | |
| 2006/0204826 A1 | 9/2006 | Borchers | |
| 2006/0204827 A1 | 9/2006 | Hickey et al. | |
| 2007/0134532 A1 | 6/2007 | Jacobson et al. | |
| 2007/0151415 A1 | 7/2007 | Chun et al. | |
| 2007/0196704 A1 | 8/2007 | Valensa et al. | |
| 2007/0207375 A1 | 9/2007 | Jaconbson et al. | |
| 2007/0231676 A1 | 10/2007 | Cassidy et al. | |
| 2008/0081223 A1 | 4/2008 | Yasumoto et al. | |
| 2008/0193825 A1 | 8/2008 | Nguyen et al. | |
| 2008/0199738 A1 | 8/2008 | Perry et al. | |
| 2008/0299417 A1* | 12/2008 | Schuisky | C23C 8/02 429/509 |
| 2009/0004547 A1 | 1/2009 | Vitella et al. | |
| 2009/0068055 A1* | 3/2009 | Sreedhara | C22C 1/045 420/428 |
| 2009/0117441 A1 | 5/2009 | Suzuki et al. | |
| 2009/0162236 A1 | 6/2009 | Hammond et al. | |
| 2009/0220833 A1 | 9/2009 | Jones | |
| 2009/0246636 A1 | 10/2009 | Chiang et al. | |
| 2009/0253020 A1 | 10/2009 | Niewolak et al. | |
| 2010/0015473 A1 | 1/2010 | Hendrikson et al. | |
| 2010/0055533 A1 | 3/2010 | Kebbede et al. | |
| 2010/0119917 A1 | 5/2010 | Kumar et al. | |
| 2010/0159344 A1 | 6/2010 | Gottmann et al. | |
| 2010/0178589 A1 | 7/2010 | Kwon et al. | |
| 2010/0233576 A1 | 9/2010 | Brandner et al. | |
| 2010/0239937 A1 | 9/2010 | Janousek et al. | |
| 2011/0039183 A1 | 2/2011 | Armstrong et al. | |
| 2011/0135531 A1 | 6/2011 | Hsu et al. | |
| 2011/0143261 A1 | 6/2011 | Brandner et al. | |
| 2011/0223510 A1 | 9/2011 | Horst | |
| 2011/0287340 A1* | 11/2011 | Mougin | C25B 9/00 429/514 |
| 2012/0028162 A1 | 2/2012 | Gottmann et al. | |
| 2012/0295183 A1 | 11/2012 | Yamanis et al. | |
| 2013/0129557 A1 | 5/2013 | Herchen et al. | |
| 2013/0230644 A1 | 9/2013 | Armstrong et al. | |
| 2013/0230792 A1 | 9/2013 | Wilson | |
| 2015/0110665 A1 | 4/2015 | Herchen et al. | |
| 2015/0147679 A1 | 5/2015 | Darga et al. | |

FOREIGN PATENT DOCUMENTS

| | | |
|---|---|---|
| JP | 61-148766 | 7/1986 |
| JP | 03-140401 A | 6/1991 |
| JP | 06-215778 | 8/1994 |
| JP | 08-176615 A | 7/1996 |
| JP | 09-199143 | 7/1997 |
| JP | 09-223506 | 8/1997 |
| JP | 09-245810 | 9/1997 |
| JP | 09-245811 | 9/1997 |
| JP | 09-277226 | 10/1997 |
| JP | 2000-281438 | 10/2000 |
| JP | 2005-216732 A | 8/2005 |

(56) References Cited

FOREIGN PATENT DOCUMENTS

| JP | 2009-212046 | | 9/2009 |
|---|---|---|---|
| JP | 2010-113955 | A | 5/2010 |
| JP | 2010-153311 | A | 7/2010 |
| WO | WO2003-007413 | A1 | 1/2003 |
| WO | WO2003-071618 | A2 | 8/2003 |
| WO | WO2006-016628 | A1 | 2/2006 |
| WO | WO 2011-096939 | A1 | 8/2011 |
| WO | WO2013-130515 | A1 | 9/2013 |
| WO | WO2014-009788 | A1 | 1/2014 |
| WO | WO 2014/009788 | A1 | 1/2014 |

OTHER PUBLICATIONS

International Search Report and Written Opinion received in connection with international application No. PCT/US2015/017226; dated May 28, 2015.
Haynes International High-Temperature Alloys, "Haynes (Reg.) 214 (TM) alloy", 1996, pp. 1-19.
Haynes International High-Temperature Alloys, "Haynes (Reg.) 230(TM) alloy", 2004, pp. 1-27.
International Search Report & Written Opinion, International Application No. PCT/US2007/08224, dated Nov. 26, 2008, 10 pgs.
International Search Report, International Application No. PCT/US2003/04808, dated Aug. 19, 2003, 9pgs.
Supplementary European Search Report, International Application No. PCT/US2003/04808, dated Jun. 2, 2008, 3pgs.
International Search Report & Written Opinion, International Application No. PCT/US2010/027899, dated Oct. 20, 2010, 11pgs.
International Preliminary Report on Patentability, International Application No. PCT/US2010/027899, dated Sep. 20, 2011, 6pgs.
International Preliminary Report on Patentability received in connection with International Application No. PCT/US2012/065213; dated May 30, 2014.
Stevenson, J.W. et al., "SECA Core Technology Program: Materials Development at PNNL," Pacific Northwest National Laboratory, Richland, WA, SECA Core Technology Review Meeting, Lakewood, CO, Oct. 25, 2005.
International Search Report and Written Opinion received in connection with international application No. PCT/US2013/027895; dated Jun. 24, 2013.
International Preliminary Report on Patentability received in connection with international application No. PCT/US2013/027895; dated Sep. 12, 2014.
La O, G. J. et al., "Investigation of Oxygen Reduction Mechanisms Using Cathode Microelectrodes Part I: Experimental Analysis of La Sr MnO and Platinum," $207^{th}$ Meeting of the Electornchemical Society, Quebec City, May 15-20, 2005, Submitted to Symposium Q1—Ninth International Symposium on SOFCs (SOFC IX) 2005.
International Search Report & Written Opinion Received in connection with International Application No. PCT/US2014/065877, dated Feb. 26, 2015.
International Search Report and Written Opinion received in connection with international application No. PCT/US2014/058251; dated Feb. 23, 2015.
Invitation to Pay Additional Fees for International Application PCT/US2014/058251, dated Jan. 2, 2015 (7 Sheets).
International Search Report & Written Opinion issued in PCT Application No. PCT/US2012/065508, dated Mar. 29, 2013.
International Search Report & Written Opinion issued in PCT Application No. PCT/US2012/065531, dated Mar. 29, 2013.
"Powder Metallurgy Design Manual," 3rd Edition, copyright Metal Powder Industries Federation, 1998 (including 5 parts).
Chu et al., "The Kinetics of the Reduction of Chromium Oxide by Hydrogen," Metallurgical Transactions B, vol. 10B, Sep. 1979, © American Society for Metals and the Metallurgical Society of AIME, pp. 401-407.
"Chromium" Wikipedia, the free encyclopedia webpage, 7pgs., Nov. 18, 2010, http://en.wikipedia.org/wiki/Chromium.
Hosokawa Micron Corp., Mechanofusion System® AMS-Mini, Product description, Table-Top Type Particle Composition Processor, Aug. 2003, 2pgs.
U.S. Appl. No. 14/501,572, filed Sep. 30, 2014, Herchen et al.
U.S. Appl. No. 14/543,095, filed Nov. 17, 2014, Darga et al.

\* cited by examiner

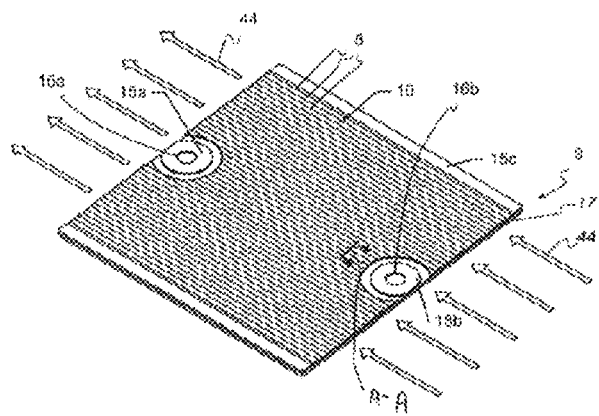

FIG. 2A
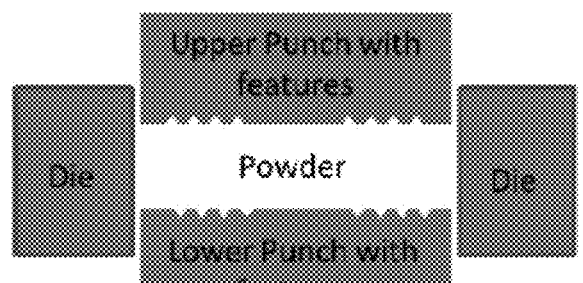
Side View
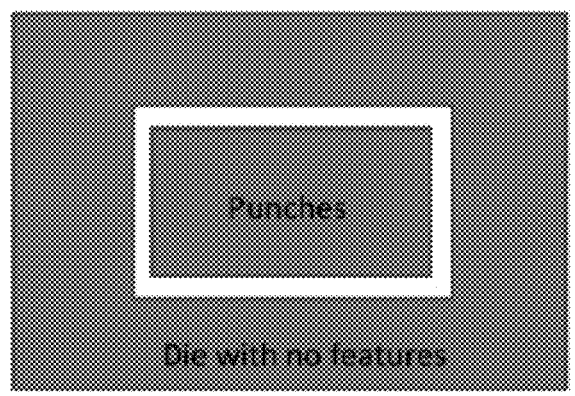
Top View
FIG. 2B

COMPOSITION AND PROCESSING OF METALLIC INTERCONNECTS FOR SOFC STACKS

CROSS REFERENCE TO RELATED APPLICATIONS

This application claims the benefit of priority to U.S. Provisional Patent Application Ser. No. 61/944,381 filed Feb. 24, 2014, the content of which is incorporated herein by reference in their entirety.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of SOFCs, the oxidizing and fuel flows should be precisely regulated. Therefore, the flow regulating structures, such as interconnects in the fuel cell system should be precisely manufactured.

SUMMARY

Embodiments include a chromium-iron interconnect which contains at least one of Fe rich regions in the interconnect and carbon in the interconnect.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIGS. 1B and 1C show, respectively, top and bottom views of an interconnect for a SOFC stack.

FIGS. 2A and 2B are respective side cross sectional and top views of a powder metallurgy (PM) apparatus for making interconnects for a fuel cell stack.

DETAILED DESCRIPTION

Figure 1A:
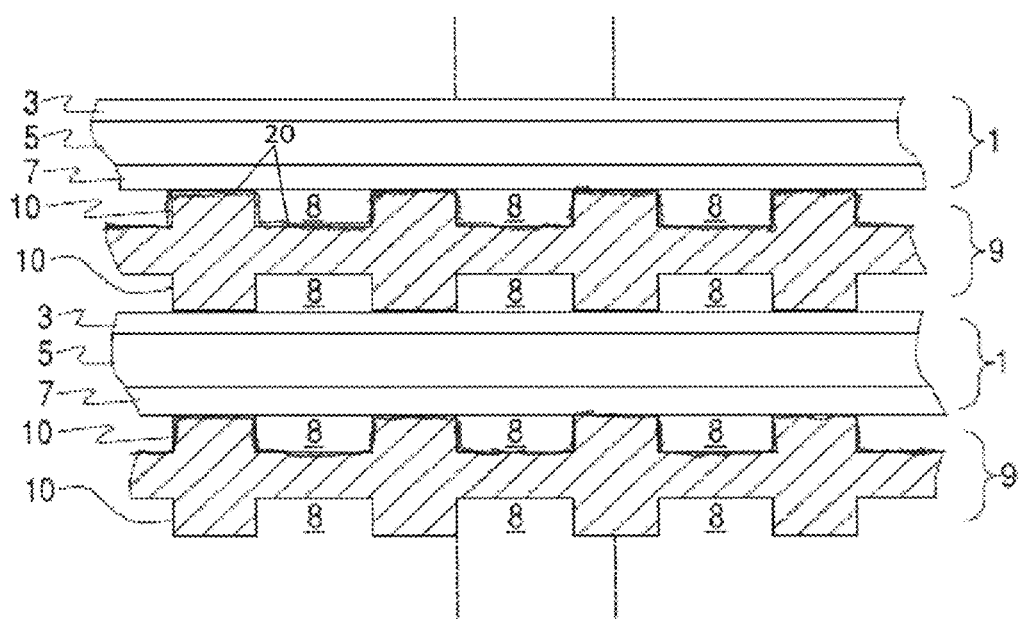
FIG. 1A illustrates a side cross-sectional view of a SOFC stack.

The various embodiments will be described in detail with reference to the accompanying drawing. Wherever possible, the same reference numbers will be used throughout the drawing to refer to the same or like parts. References made to particular examples and implementations are for illustrative purposes, and are not intended to limit the scope of the invention or the claims.

FIG. 1A illustrates a SOFC stack in which each SOFC 1 comprises a cathode electrode 7, a solid oxide electrolyte 5, and an anode electrode 3. Fuel cell stacks are frequently built from a multiplicity of SOFC's 1 in the form of planar elements, tubes, or other geometries. Fuel and air has to be provided to the electrochemically active surface, which can be large.

The gas flow separator 9 (referred to as a gas flow separator plate when part of a planar stack), containing gas flow passages or channels 8 between ribs 10, separates the individual cells in the stack. The ribs 10 on opposite sides of the plate may be offset from each other, as described in U.S. Published Patent Application Number 2008/0199738 A1 (filed on Feb. 16, 2007 as U.S. application Ser. No. 11/707,070) which is incorporated herein by reference in its entirety. The gas flow separator plate separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of the stack, there may be an air end plate or fuel end plate (not shown) for providing air or fuel, respectively, to the end electrode.

Frequently, the gas flow separator plate 9 is also used as an interconnect which electrically connects the anode or fuel electrode 3 of one cell to the cathode or air electrode 7 of the adjacent cell. In this case, the gas flow separator plate which functions as an interconnect is made of or contains electrically conductive material. FIG. 1 shows that the lower SOFC 1 is located between two interconnects 9.

FIGS. 1B and 1C show, respectively, top and bottom views of an interconnect 9. The portions of interconnect 9 shown in side cross-section in FIG. 1A are provided along lines A-A in FIGS. 1B and 1C. The interconnect 9 contains gas flow passages or channels 8 between ribs 10. The interconnect 9 in this embodiment includes at least one riser channel 16a for providing fuel to the anode-side of the SOFC 1, as illustrated by arrow 29. The riser channel 16a generally comprises a fuel inlet riser opening or hole that extends through at least one layer of the fuel cells and interconnects in the stack. As illustrated in FIG. 1C, the fuel can flow through the inlet riser channel 16a to the anode-side of each fuel cell. There, the fuel can collect in an inlet plenum 17a (e.g., a groove in the interconnect's surface), then flow over the fuel cell anode 3 through gas flow channels 8 formed in the interconnect 9 to an outlet plenum 17b and then exit through a separate outlet riser channel 16b.

The cathode side, illustrated in FIG. 1B, can include gas flow passages or channels 8 between ribs 10 which direct air flow 44 over the cathode electrode of the fuel cell. Seals 15a, 15b can seal the respective risers 16a, 16b on the cathode-sides of the interconnect and fuel cell to prevent fuel from reaching the cathode electrode of the fuel cell. The seals may have a donut or hollow cylinder shape as shown so that the risers 16a, 16b extend through the hollow middle part of the respective seals 15a, 15b. The seals 15a, 15b can include an elevated top surface for contacting against the flat surface of the adjacent SOFC 1. Strip seals 15c may be provided along two opposing edges of the interconnect. A peripheral (i.e., window) seal 15d can seal the anode-side of the interconnect and fuel cell to prevent air from reaching the anode electrode of the fuel cell, as shown in FIG. 1C.

For solid oxide fuel cell stacks, the interconnect 9 is typically made from an electrically conductive metal material, and may comprise a chromium alloy, such as a Cr—Fe alloy made by a powder metallurgy technique. The powder metallurgy technique may include pressing and sintering a mixture of Cr and Fe powders to form a Cr—Fe alloy interconnect in a desired size and shape (e.g., a "net shape" or "near net shape" process). A typical chromium-alloy interconnect may comprise at least about 80% chromium, and preferably more than about 90% chromium, such as about 94-96% (e.g., 95%) chromium by weight. The interconnect may contain less than about 20% iron, and preferably less than about 10% iron, such as about 4-6% (e.g., 5%) iron by weight. The interconnect may contain less than about 2%, such as about zero to 1% of other materials, such as yttrium or yttria, as well as residual or unavoidable impurities.

Blended Cr and Fe elemental powders are pressed in a hydraulic or mechanical press to produce a part having the desired interconnect shape. The Cr and Fe powders are blended with an organic lubricant and pressed into so-called "green parts" using a conventional powder metallurgy technique. The "green parts" have substantially the same size and shape as the finished interconnect (i.e., "near net shape"). The lubricant in the green parts is removed before the parts are sintered. The lubricant is removed in a debinding process in a furnace at a temperature of 200° C. to 800° C. After debinding, the compressed powder Cr—Fe interconnects are sintered at high-temperature (e.g., 1150-1450° C.) to promote interdiffusion of the Cr and Fe. The interconnects may undergo a separate controlled oxidation treatment, such as by exposing the interconnects to an oxidizing ambient, such as air at high temperature after sintering, prior to use of the interconnects in the stack.

The surface of the interconnect 9 that in operation is exposed to an oxidizing environment (e.g., air), such as the cathode-facing side of the interconnect, may be coated with a protective coating layer (20 in FIG. 1A) in order to decrease the growth rate of a chromium oxide surface layer on the interconnect and to suppress evaporation of chromium vapor species which can poison the fuel cell cathode. Typically, the coating layer, which can comprise a perovskite such as lanthanum strontium manganite (LSM), may be formed using a spray coating or dip coating process. Alternatively, other metal oxide coatings, such as a spinel, such as a $(Mn, Co)_3O_4$ spinel, can be used instead of or in addition to LSM. Any spinel having the composition $Mn_{2-x}Co_{1+x}O_4$ ($0 \leq x \leq 1$) or written as $z(Mn_3O_4)+(1-z)(Co_3O_4)$, where ($\frac{1}{3} \leq z \leq \frac{2}{3}$) or written as $(Mn, Co)_3O_4$ may be used. The protective coating layer 20 is typically formed on the surface of the interconnect 9 after the sintering and controlled oxidation steps described above. The surface of the interconnect 9 must typically be pre-treated to remove surface oxides (e.g., via a grit blasting process) before the protective layer 20 is applied.

Powder metallurgy (PM) technology creates the shape of a part using three components in a compaction press—the upper punch, the lower punch and a die. The design of the interconnect necessitates various cross sectional thickness to be molded by features on the punches, i.e., there is cross sectional thickness variation in the direction of compaction tonnage (FIGS. 2A and 2B). This is different from most parts that are processed using PM technology where the punches are typically flat and the die is the component that contains the geometric features, i.e., the cross sectional thickness in the direction of compaction tonnage is uniform.

There are several requirements of a metallic interconnect (IC) for SOFC for optimal performance, such as coefficient of thermal expansion (CTE) and low electronic resistance. For the case of a planar SOFC it is often advantageous to match the CTE of the IC with other components of the stack including the cell. In the case of a Cr—Fe interconnect made from powder metallurgy, the CTE can be tailored based on total iron content and amount the Fe and Cr diffuse into each other in solid solution phase. The amount of iron in the chromium phase is controlled by total iron content, size of iron particles, and amount of diffusional energy (time or temperature) during sintering of the part. The amount of iron diffusion into chromium for a given time and temperature of sintering can be increased by starting with a smaller average particle size of iron. For example, an iron powder with a particle size distribution (PSD) with a d50 (median particle diameter) of ~5 um would have shorter diffusion lengths compared to a powder with a d50 of ~50 um. Furthermore, the sintering time until the rate of change of CTE slows down is shorter for fine powder vs. coarse powder. Therefore, from a uniform CTE point of view, a smaller Fe particle size would be desirable.

In addition to CTE, the electronic resistance at the surface of the IC is an important aspect of the IC and it is preferred to have a low resistance at the portions of the IC, such as rib tips, that come into contact with the fuel cell. The surface resistance of the Cr—Fe IC, and more specifically the interfacial resistance of the IC to the fuel cell, is affected by the size and amount of Fe near the surface. This is particularly true on the anode side of the interconnect that is exposed to a fuel atmosphere. For example, some contaminants are more chemically reactive, or more quickly transported, in the reducing atmosphere on or near the fuel side. The size and amount of the Fe-rich regions in the IC are determined by many factors, including the Fe particle size in the constituent powder, and the energy (time/temperature) in the sintering process. At a critical sintering energy which is higher for larger Fe particles, Cr diffuses into a Fe-rich region to such a degree that the region is no longer substantially rich in Fe, and the Fe/Cr ratio is close to uniform within this region. In this context, "Fe-rich" is intended to mean a region substantially rich in Fe, such as having at least 50% more, such as 100-2000% more Fe than other parts of the interconnect. For example, for a Fe percentage of 5% by weight, "Fe-rich" is taken to mean a contiguous (or nearly contiguous) region of 10-100% Fe, such as more than 20%. For a typical powder metallurgy process, small Fe particles will form smaller Fe-rich regions, and larger particles will form larger Fe-rich regions. Hence, Fe particle size and Fe-rich region size are used interchangeably in the following description, but any process for manufacturing an IC by which the size and distribution of Fe-rich regions are controlled is considered to be within the scope of the invention.

Without wishing to be bound by a particular theory, it is believed there is a tradeoff between sinterability and performance for a Fe particle size. Smaller (e.g., fine) Fe particles require less time and lower temperature to achieve a given amount of Fe/Cr interdiffusion, which lowers the manufacturing costs. Smaller particles have the additional advantage of low part-to-part variability: smaller particles more quickly sinter to such a degree that there is relatively little CTE variability for typical manufacturing variation in particle size or sintering time or temperature. However, smaller particles may have substandard performance; for example, they may more easily accumulate contamination from the powder or interconnect manufacturing process, or have high resistance, or other disadvantages. The improved performance of coarse particles applies to individually large, contiguous particles, not agglomerates of fine particles. To the extent that surface area impacts performance (for example, contamination introduced from the powder or IC manufacturing process), agglomerates of fine particles may have substandard performance as compared to contiguous large particles of similar size.

Larger (e.g., coarse) Fe particles may provide improved performance but require more sintering to achieve a target CTE. Larger particles may also have greater part to part variation in CTE.

The sintering energy may constrained by other factors. For example, higher sintering energy may be required to achieve other beneficial properties such as high density, low porosity, or to close pores which could cause fuel leakage through the IC, or allow oxide or nitride growth to cause mechanical distortion in the presence of air in the intended operating environment.

Therefore for a given sintering energy it is beneficial to have a controlled PSD: just enough Fe in the form of smaller particles to achieve the targeted CTE in a fast/low temperature process, and the remainder as larger particles to meet performance targets. For example, a percentage from 4%-6% of the IC may be Fe (balance Cr), such as 5.2% Fe. Of that Fe, a fraction such as 10%-20% by weight may be smaller particles (such as d50=7-40 micron, such as 30 micron), and the balance larger particles (such as d50=60 micron to 150 micron, such as 90 micron). Other ratios of Fe to Cr, or the addition of other metals to form alloys, or the addition of other non-metallic materials are considered to be within the scope of the invention. Added materials might include any transition metal or transition metal oxide, such as Mn, Co, Y, or yttria ($Y_2O_3$).

The PSD may be multimodal, such as bimodal (distinct populations of smaller and larger particles, with few particles of intermediate size). Other embodiments might include trimodal (3 peaks), or more than 3 peaks. Alternatively, the distribution of particle sizes may be monomodal yet broad enough to have the required amount of particles at the desired smaller and larger sizes or monomodal with a "shoulder", which are all within the scope of this invention.

A second way to achieve this effect would be to form the part from the Cr—Fe powder that contains the fine Fe, and then purposely put the coarse iron particles on or near the surface of the IC, such as the fuel surface of the IC. This could be accomplished during the die fill with a double filling of two different powders and then pressing. Alternatively, the part could be pressed with the first powder containing fine Fe, the coarse iron powder applied to the surface by any suitable method, such as wet or dry spray, and then followed by a final pressing.

In a third embodiment, the coarse Fe (i.e., the Fe rich regions) is located at the anode rib tips only, and a smaller amount of fine iron is at the air side. In a fourth embodiment, the PSD and weight distribution are "graded", such that coarser Fe is near one side, such as a fuel side, and/or more Fe by weight is near a second side, such as an air side. In this way, the PSD can be tailored to have more coarse particles near one side, while compensating for the mismatched CTE by putting more of the Fe by weight where the coarse powder is located. In this way the IC will not distort in thermal cycling due to CTE non-uniformity within the part. The PSD grading may be accomplished during a fill process, for example by perturbing the powder during filling to change the relative distribution of fine/coarse particles in the die, or by performing successive fills (a first fill with coarser powder and a second fill with a finer powder), or by perturbing the die after the fill has been accomplished (vibration, etc.) to cause fine particles to settle, and so on.

In a fifth embodiment, only coarse (i.e., larger) Fe powder is used, with no fine Fe powder. The Fe particle size is d50=60 micron to 200 micron, for example 70 micron.

In further embodiments, the weight ratio of the fine (d50=7-40 micron, such as 30 micron) to coarse (d50=60 micron to 150 micron, such as 90 micron) iron particles ranges from 1:1 to 50:1, such as 4:1 to 10:1. In other words, the iron powder contains the same amount of the fine and course particles or more fine than coarse particles. The following are exemplary Fe PSDs based on weight.

In one embodiment, 0.4% of particles are larger than 209 um, 4.5% are larger than 148 um, 38% are between 88 and 148 um, 30% are between 62 and 88 um, 28% are less than 62 um, 4% are less than 26 um, and 0% are less than 11 micron. D50 is approximately 80 micron.

In another embodiment, 0.2% of particles are larger than 209 um, 2.2% are larger than 148 um, 20% are between 88 and 148 um, 22% are between 62 and 88 um, 18% are between 44 and 62 um, 39% are less than 44 um, 3% are less than 8 um, and 0% are less than 3 micron. D50 is approximately 55 um.

In another embodiment, 0.6% of particles are larger than 249 um, 4% are larger than 209 um, 24% are between 148 and 209 um, 24% are between 105 and 148 um, 24% are between 74 and 105 um, 25% are less than 74 um, and 2% are less than 37 micron. D50 is approximately 110 microns.

In another embodiment, 0.1% of particles are larger than 296 um, 5.5% are larger than 176 um, 4.2% are between 88 and 176 um, 30.5% are between 44 and 88 um, 37% are between 31 and 44 um, 23% are below 31 um, and 3.3% are below 18 micron. D50 is approximately 40 microns.

In another embodiment, it has been found that the amount of carbon in the Cr—Fe powder affects the surface and interfacial electronic resistance of IC on the anode (i.e., fuel) side. Without wishing to be bound by any particular theory, it is believed that carbon in and on the powder reacts with impurities during the sintering process forming carbides and tying the impurities up in a benign state. For example, impurities such as W, Ti, B and Si may react with carbon to form carbides. Ideally, the amount of carbon in the system should exceed the amount of impurity reactants to ensure a complete reaction; therefore, excess carbon may be required. The amount of carbon in the powder system can be tailored by adding graphite or other forms of carbon to the powder before pressing and sintering. In addition, the amount of carbon based binders or lubricants added to the powder can be controlled. Carbon at a certain level needs to be present in the powder part during the high temperature sintering in a reducing atmosphere for the impurities to react with the carbon and/or form carbides. Therefore, during the heat up and sintering process the temperature rates and atmospheres are controlled such that the carbon does not burnout (oxidized to CO or $CO_2$) before the solid state reactions with carbon occur. For example, the binder or lubricant may be burned out in a reducing atmosphere such as hydrogen, leaving elemental carbon behind within the part or volatile hydrocarbons may be redeposited in the same furnace during cool-down. If the de-lube/de-wax process takes place in a separate furnace, an additional amount of carbon may added in the form of a spray lubricant or similar organic material, or as elemental carbon. The added carbon content may be as high as 0.2% (by weight), such as 0.05 to 0.2%, including 0.08 to 0.2%. The amount of carbon remaining in the interconnect part (as solid solution, or in compounds such as carbides (e.g., WC, TiC, SiC, BC, etc.)) after all manufacturing processes is completed (e.g., after the sintering process) is greater than zero and less than 0.03 wt %, such as at least 0.002 wt. %, including at least 0.005 wt. %, at least 0.008 wt. %, at least 0.009 wt. % or at least 0.01 wt. %, such as 0.002 to 0.02% by weight, including 0.005, 0.008, 0.009 or 0.01 wt % to 0.02 wt. %.

In summary, one embodiment of the invention provides an interconnect with a controlled amount of Fe powder, such that the PSD has a particular fraction of fine and coarse particles, or all coarse particles, and proper distribution of fine and coarse iron within the part, combined with the above described Fe weight distribution, such that the part does not distort at high temperature. In another embodiment, carbon is provided into the interconnect during manufacturing, whether specifically added or as a byproduct of the manufacturing process.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of fabricating an interconnect for a fuel cell stack, comprising:
    providing particles of Fe and Cr in a die cavity of a powder press apparatus;
    compressing the particles in the powder press apparatus to form the interconnect; and
    sintering the interconnect after compressing the particles;
    wherein the Fe particles have a multimodal particle size distribution or a broad monomodal particle size distribution containing smaller Fe particles having a d50 of 7-40 microns and larger Fe particles having a d50 of 60 to 150 microns;
    wherein after sintering the interconnect comprises Fe-rich regions,
    wherein the larger Fe particles are selectively provided at a fuel side of the interconnect to form the Fe-rich regions on the fuel side of the interconnect.

2. The method of claim 1, wherein the particle size distribution is multimodal.

3. The method of claim 2, wherein the multimodal particle size distribution is a bimodal particle size distribution.

4. The method of claim 1, wherein the smaller Fe particles having the d50 of 7-40 microns comprise 10%-20% by weight of the total Fe particles and the larger particles having the d50 of 60 to 150 microns comprise 80%-90% by weight of the total Fe particles.

5. The method of claim 1, wherein a weight ratio of the smaller Fe particles having the d50 of 7-40 microns to the larger particles having the d50 of 60 to 150 microns is between 1:1 and 50:1.

6. The method of claim 1, wherein the larger Fe particles are selectively provided only in rib tip regions on the fuel side of the interconnect to form the Fe-rich regions only in the rib tip regions on the fuel side of the interconnect.

7. The method of claim 1, wherein the particle size distribution comprises the monomodal particle size distribution containing smaller Fe particles having the d50 of 7-40 microns and larger Fe particles having the d50 of 60 to 150 microns.

8. The method of claim 1, wherein the interconnect comprises at least about 90 wt % chromium and less than about 10 wt % iron and the fuel cell stack comprises a solid oxide fuel cell stack.

9. The method of claim 1, wherein the particles are provided to the die cavity with a carbon containing lubricant material such that at least a portion of the carbon remains in a completed interconnect.

10. The method of claim 1, further comprising adding carbon to the particles such that at least a portion of the carbon remains in a completed interconnect.

11. The method of claim 1, wherein the Fe-rich regions comprise at least 50% more Fe than non-Fe-rich regions.

12. A method of fabricating an interconnect for a fuel cell stack, comprising:
    providing particles of Fe and Cr in a die cavity of a powder press apparatus;
    compressing the particles in the powder press apparatus to form the interconnect: and
    sintering the interconnect after compressing the particles;
    wherein the Fe particles have a multimodal particle size distribution or a broad monomodal particle size distribution containing smaller Fe particles having a d50 of 7-40 microns and larger Fe particles having a d50 of 60 to 150 microns;
    wherein after sintering the interconnect comprises Fe-rich regions,
    wherein the larger Fe particles are selectively provided at a fuel side of the interconnect to form the Fe-rich regions on the fuel side of the interconnect,
    wherein the step of providing particles of Fe and Cr in the die cavity comprises providing the Cr particles and the smaller Fe particles in the die cavity followed by providing the Cr particles and the larger Fe particles over the smaller Fe particles in the die cavity, such that the Fe-rich regions are located only on the fuel side of the interconnect after the sintering.

13. The method of claim 12, wherein the step of compressing is conducted after providing the Cr particles and the larger Fe particles.

14. The method of claim 12, wherein the step of compressing is first conducted after providing the Cr particles and the smaller Fe particles in the die cavity and before providing the Cr particles and the larger Fe particles over the smaller Fe particles in the die cavity, and is then conducted again after providing the Cr particles and the larger Fe particles over the smaller Fe particles in the die cavity.

15. A method of fabricating an interconnect for a fuel cell stack, comprising:
    providing particles of Fe and Cr in a die cavity of a powder press apparatus;
    compressing the particles in the powder press apparatus to form the interconnect; and
    sintering the interconnect after compressing the particles;
    wherein the Fe particles have a multimodal particle size distribution or a broad monomodal particle size distribution containing smaller Fe particles having a d50 of 7-40 microns and larger Fe particles having a d50 of 60 to 150 microns;

wherein after sintering the interconnect comprises Fe-rich regions, wherein the Fe particle size distribution and weight distribution are graded, such that the larger Fe particles are located nearer the fuel side of the interconnect than an air side of the interconnect, and more Fe by weight is located nearer the air side of the interconnect than the fuel side of the interconnect.

16. The method of claim 15, wherein the Fe particle size distribution and weight distribution are graded during the step of providing particles of Fe and Cr in the die cavity by perturbing a powder of particles of Fe and Cr during or after filling of the die cavity with the powder.

17. The method of claim 15, wherein the Fe particle size distribution and weight distribution are graded by successively filling the die cavity with the larger Fe particles and the smaller Fe particles.

* * * * *